United States Patent
Sherman

(10) Patent No.: US 9,547,994 B2
(45) Date of Patent: Jan. 17, 2017

(54) PROGRESSIVE REFERENCE SYSTEM, METHOD AND APPARATUS

(76) Inventor: Kenneth Nathaniel Sherman, Las Vegas, NV (US)

(*) Notice: Subject to any disclaimer, the term of this patent is extended or adjusted under 35 U.S.C. 154(b) by 1221 days.

(21) Appl. No.: 12/284,706

(22) Filed: Sep. 24, 2008

(65) Prior Publication Data
US 2009/0106206 A1    Apr. 23, 2009

Related U.S. Application Data

(63) Continuation-in-part of application No. 10/951,313, filed on Sep. 27, 2004.

(60) Provisional application No. 60/507,763, filed on Oct. 1, 2003.

(51) Int. Cl.
| | |
|---|---|
| G06F 17/00 | (2006.01) |
| G09B 5/00 | (2006.01) |
| G06F 17/27 | (2006.01) |
| G06F 17/30 | (2006.01) |
| G06F 17/24 | (2006.01) |

(52) U.S. Cl.
CPC .............. *G09B 5/00* (2013.01); *G06F 17/241* (2013.01); *G06F 17/274* (2013.01); *G06F 17/277* (2013.01); *G06F 17/2735* (2013.01); *G06F 17/30613* (2013.01); *G06F 17/30619* (2013.01); *G06F 17/30631* (2013.01)

(58) Field of Classification Search
CPC G06F 17/2735; G06F 17/274; G06F 17/2235; G06F 17/241; G06F 17/277; G09B 5/00
USPC .......... 715/254, 200, 255–259; 707/706–708
See application file for complete search history.

(56) References Cited

U.S. PATENT DOCUMENTS

| | | | |
|---|---|---|---|
| 4,544,360 A | 10/1985 | Goodman | 434/178 |
| 6,014,663 A * | 1/2000 | Rivette et al. | 707/690 |
| 6,366,908 B1 | 4/2002 | Chong et al. | 707/3 |
| 6,400,996 B1 | 6/2002 | Hoffberg et al. | 700/83 |
| 6,407,757 B1 | 6/2002 | Ho | 715/776 |
| 6,551,109 B1 | 4/2003 | Rudmik | 434/322 |

(Continued)

OTHER PUBLICATIONS

Adobe Systems Incorporated, Selections from Adobe Acrobat 7.0 Professional Help file, Copyright 1984-2005.*

(Continued)

*Primary Examiner* — Chau Nguyen
(74) *Attorney, Agent, or Firm* — Aka Chan LLP

(57) ABSTRACT

A written document (hereinafter referred to as a "work," on electronic format which includes, stories, novels, education texts, biographies, compilations, collections, anthologies, tracts, and any other traditional format for relatively extensive texts) provides access to reference, bibliography and/or definition material through an electronic software capability associated with the work. Depending upon reader access information or characteristics (e.g., age, grade, proficiency, or position within the work or any other identifiable reader characteristic or access limitation), any request for reference material, definitions, explanations, translations, or other material provided in the associated software capability is automatically limited by system acknowledgement of the reader access information or characteristics. As the reader's access information or characteristics change, the quality and/or quantity and/or format of requested information with respect to a work changes.

24 Claims, 1 Drawing Sheet

| |
|---|
| CREATE OF COPY PRIMARY WORK |
| DETERMINE CONTENT ACCESSIBLE TO OR REQUIRING DEFINITION |
| DETERMINING CONTENT APPROPRIATE TO USER CHARACTERISTICS AS PRIMARY WORK PROGRESSES |
| PROVIDING DEFINITIONS APPROPRIATE TO USER CHARACTERISTICS AT DIFFERENT STAGES OF PRIMARY WORK (E.G., CHAPTERS, SECTIONS, USER STATUS) |
| PROVIDING ACCESS TO DEFINITIONS INCLUDING REFERENCE TO POSITION WITHIN PRIMARY WORK |
| ALTERING PROVIDED DEFINITIONS UPON USER REQUEST BASED UPON CHANGES IN USER PRIMARY WORK POSITION OR CHANGE IN USER CHARACTERISTICS |
| OPTIONALLY PROVIDING ON-LINE USER ACCESS TO ALTER DEFINITIONS |
| ADMINISTRATIVE REVIEW OF PROPOSED ALTERED PROGRESSIVE DEFINITIONS |
| REFUSAL OR ACCEPTANCE OF PROPOSED ALTERED PROGRESSIVE DEFINITIONS |

(56) References Cited

U.S. PATENT DOCUMENTS

| | | | |
|---|---|---|---|
| 6,633,742 B1* | 10/2003 | Turner | G09B 5/00 |
| | | | 434/350 |
| 6,728,681 B2 | 4/2004 | Whitham | 704/275 |
| 6,732,090 B2 | 5/2004 | Shanahan et al. | 707/3 |
| 6,766,311 B1 | 7/2004 | Wall et al. | 706/46 |
| 6,850,935 B1* | 2/2005 | Ponte | G06F 17/30867 |
| 7,254,576 B1* | 8/2007 | Hamilton | 707/706 |
| 7,664,775 B2* | 2/2010 | Reed et al. | 707/999.102 |
| 7,680,853 B2* | 3/2010 | Yu et al. | 707/708 |
| 7,849,393 B1* | 12/2010 | Hendricks et al. | 715/203 |
| 2003/0129576 A1* | 7/2003 | Wood et al. | 434/362 |
| 2005/0187949 A1* | 8/2005 | Rodenburg | 707/100 |
| 2007/0083506 A1* | 4/2007 | Liddell et al. | 707/5 |
| 2007/0083828 A1* | 4/2007 | Toriyama | G06F 3/0233 |
| | | | 715/816 |
| 2008/0059488 A1* | 3/2008 | Iyengar | G06F 17/30613 |
| 2008/0140411 A1* | 6/2008 | Millman | G09B 5/062 |
| | | | 704/270 |

OTHER PUBLICATIONS

"Guidelines for the Preparation of an Index", The Chicago Manual of Style, Apr. 2005, pp. 6.*

Terence Cavanaugh, "EBooks and Accommodations—Is this the future of print accommodation?", Copyright 1982-2002 The H.W. Wilson Company, from Source: Teaching Exceptional Children 35 No. 2 N/D 2002, pp. 7.*

Potter et al., "Word Selection in Reading Sentences: Preceding Versus Following Contexts", 1998, Journal of Experimental Psychology: Learning, Memory and Cognition, vol. 24, No. 1, pp. 33.*

U.S. Appl. No. 10/951,313, filed Sep. 27, 2005, Sherman.

* cited by examiner

| |
|---|
| CREATE OF COPY PRIMARY WORK |
| DETERMINE CONTENT ACCESSIBLE TO OR REQUIRING DEFINITION |
| DETERMINING CONTENT APPROPRIATE TO USER CHARACTERISTICS AS PRIMARY WORK PROGRESSES |
| PROVIDING DEFINITIONS APPROPRIATE TO USER CHARACTERISTICS AT DIFFERENT STAGES OF PRIMARY WORK (E.G., CHAPTERS, SECTIONS, USER STATUS) |
| PROVIDING ACCESS TO DEFINITIONS INCLUDING REFERENCE TO POSITION WITHIN PRIMARY WORK |
| ALTERING PROVIDED DEFINITIONS UPON USER REQUEST BASED UPON CHANGES IN USER PRIMARY WORK POSITION OR CHANGE IN USER CHARACTERISTICS |
| OPTIONALLY PROVIDING ON-LINE USER ACCESS TO ALTER DEFINITIONS |
| ADMINISTRATIVE REVIEW OF PROPOSED ALTERED PROGRESSIVE DEFINITIONS |
| REFUSAL OR ACCEPTANCE OF PROPOSED ALTERED PROGRESSIVE DEFINITIONS |

PROGRESSIVE REFERENCE SYSTEM, METHOD AND APPARATUS

RELATED APPLICATION DATA

This patent application is a continuation-in-part of U.S. patent application Ser. No. 10/951,313, filed Sep. 27, 2004, which claims the benefit of U.S. patent application 60/507,763, filed Oct. 1, 2003, which are incorporated by reference along with all other references cited in this application.

BACKGROUND OF THE INVENTION

1. Field of the Invention

The present invention relates to the field of media, such as text, video, graphics, and sound, containing terms, ideas, images, and information for which background references, footnotes, translations or definitions may be desirable to the reader.

2. Background of the Art

When individuals use primary text such as written, video, film, graphic, or sound recording matter (which includes hard copy material and electronic material), there may be a need or desire to provide reference material to a reader, upon request, to enable the reader to appreciate or understand the text, graphics, or sound. In a learning or scholastic environment, it may also be necessary to limit access to reference or definition material, or, at least, to limit the degree to which terms can, or should be, explained to specific readers depending on their particular, and distinguishable, levels of progress. These levels of progress, for example, may be defined by the reader's age, grade level, program level (e.g., Advanced Placement versus Basic study tracks), stage of study within an ongoing course (e.g., first semester versus second semester), the user's place in the sequence of the (written, video, graphic, or sound recording) material, and the like. At the present time, when a reader requests reference material or definition from within material (a text, sound recording, video game or video), a uniform reference or uniform (single) definition for the requested term is provided. This system has limited informational and educational options both for the providers and users of written, graphic, video, videogames, and sound recordings.

SUMMARY OF THE INVENTION

Media is combined with associated user reference material the content of which varies according to reader characteristics. Reader characteristics include specified educational level, skill level, place in the progress of the media, age, and so on. Media can be in the form of text, images, or sound. Media can be a written document, such as a story, tract, novel, text book, biography, compilation, collection, or anthology. It can be a score of a musical composition or a recording of music, It can be a written play or an audio or video or film recorded play. It can be a data base, a series of images such as in a picture book, movie, or video, or it can be a series of sounds, such as recording of bird sounds or a spoken word recording. Each of these forms is hereinafter referred to as a "work." A work can be available in electronic format which provides easy access to reference, bibliography and/or definition material through an electronic software capability associated with the work. Depending upon reader access information or characteristics, (e.g., age, grade, proficiency, position within the work or any other identifiable reader characteristic or access limitation) any request for reference material, definitions, explanations, translations, footnotes, or other material available from the associated software is automatically limited by system acknowledgement of specific reader access information or reader characteristics. As the reader's access information or characteristics change, the quality and/or quantity and/or format of information supplied to the reader with respect to the work changes.

BRIEF DESCRIPTION OF THE FIGURE

FIG. 1 shows a flow diagram of a system by which the presently described technology of a Progressive Reference system is prepared.

DETAILED DESCRIPTION OF THE INVENTION

A "Progressive Reference" system according to the presently described technology is a reference work classification scheme that contains citations or available information (e.g., definitions, background material, citations, foot notes, annotations, translations, cross-references, or other information, or sources of information, that might be useful to a reader) that differ for given requested terms or requested ideas depending on what stage of training, what level of authorized access has been granted, or where in the primary material (or Work) the reader is at when he or she looks up the term, phrase, name or idea. An ordinary reference work, such as a concordance or index, would provide a single, uniform, general definition to describe the idea as it occurs in the whole text or group of related texts.

The present technology may work for any type of information, source material and media and combinations thereof including but not limited to religious works such as the Bible, the Koran, the Talmud, more conventional texts such as trade books, trade manuals, repair or user manuals, novels, textbooks, histories, biographies, conventional movies, educational tracts, text books, interactive movies, interactive videos, DVD'S, CD-ROM's, CDs, internet applets and content, overhead projector and computer displays, audio and video tapes, hard-disk drives, solid-state memories, magazines, book overlays, plays, poems, videogames, computer games, musical scores, computer code, databases, DNA sequences, web pages, interactive web pages, web pages from application service providers, and so on. Furthermore, the invention is applicable to all forms and types of reference schemes such as, but not limited to, encyclopedias, concordances, glossaries, dictionaries, thesauruses, taxonomies, ontologies, indexes, maps, graphics, and so on.

Unlike previous referencing schemes, a Progressive Reference depends on one or more user characteristics. A user characteristic can be supplied by the user, such as the user's age, gender, and/or educational level. A user characteristic can be supplied automatically such as the user's position in the source material (or primary work), and/or the time and date of the inquiry, or automatically from user associated data in a data base, or by a supervisor. A user characteristic can be supplied manually, semi-automatically or automatically. A user can supply information that directs the limitation to specific historical time periods, cultures, academic disciplines, and so on, limited only by the nature of citations that have been edited into the Progressive Reference data base for the particular work at the time the inquiry is made. The Progressive Reference, thus, depends on a known or identified, reader characteristic, or set of characteristics, to select an allotted scope or type of information that it provides to the user. A Progressive Reference requires that each occurrence of a definition, citation, or "entry" for each term is available on an "updated" basis or changed in correspondence to each reader, for each place the certain term appears, and/or each time the inquiry is made—except in those instances where nothing new and important has happened with respect to that term since it last occurred in the work, and except where no change is expected in the need for more detailed or different explanations of that term since it was last encountered in the source material or since the last request. Certain terms may not need to have a Progressive Reference capability as the degree of need for expanded definition, or any definition, may not have to change over the course of use of the primary work. However, the advantages of the Progressive Reference for some terms in a primary work do change and are provided as a Progressive Reference. Normally, information in a Progressive Reference entry will be limited to what is found in the source material, or work, between the start of the source material and where the user is in the source material when the user requests a definition. Entries may add information from outside of the work, itself, that becomes relevant and useful, particularly at a point of progression in the source material, but entries should, normally, not contain any information, either from the source material or from outside sources, that should be revealed only later. Unlike standard entries, a Progressive Reference entry would not give away the plot before the denouement, although at the conclusion of the primary work, detailed explanations, identification of clues, and explanations of foreshadowings may be provided.

In a Progressive Reference Glossary for the Harry Potter series, for example, a reader on page 72 of *Harry Potter and the Chamber of Secrets*, J. K. Rowling's second volume in the series, will look up the word, "potions" and indicate (or will be so automatically identified in an electronic text) that he or she is on Vol II, page 72. In a standard Harry Potter encyclopedia, a researcher would indicate only the word, "Potions" and would find examples of many, perhaps all, of the potions taught at Hogwarts or those used by wizards, in generals, in all of the published Harry Potter books. In a Progressive Reference, only those potions that have already been mentioned in Volume 1, *Harry Potter and the Sorcerer's Stone*, and those already mentioned in the first 72 pages of Volume 2, *Harry Potter and the Chamber of Secrets*, will be displayed—consistent with Ms Rowling's assumption that the reader knows, and remembers, all of what has been revealed up to Page 72 and nothing beyond that.

Using the present technology of a Progressive Reference, a reader of an E-Book would have only to tap on the word she wanted to learn more about. The entry for that specific word at that specific location on the page would be called up by the system and appears on the reader's screen. Similarly, in a movie, interactive movie, TV show, interactive TV show, or videogame, a keystroke, a word spoken by the user, or other user signal would call up the entry appropriate to where the user saw the word, or the idea suggesting the entry, in the source material. The entry could contain information appropriate to the medium such as previous scenes from the source material and/or scenes from other TV shows, videogames, news events, sporting events or movies. The entry could contain URLs and links to web sites. Information from outside sources could include definitions, pronunciation, and etymology of terms, germane historical antecedents, and cultural allusions. Information provided may provide hints that the author would approve, but should not reveal information that will spoil the suspense or add an unnecessary burden to the reader. In an educational environment, where student access to information may be controlled by a teacher or school, enabling passwords or a central control of degree of access may be overseen by the educational institute. For example, in a language study program, when a student asks for a translation of a word with multiple meanings, the Progressive Reference would provide different definitions for students dependent upon their level in the course, which would be identified in the e-based system. For example, a student in a 101 course would receive a far more specific (and more useful) definition for a specific term or phrase than would someone in a graduate level course translating texts from a specific time period, where a term may have or have had a different meaning.

At the other extreme of technology, the Progressive Reference could be in the form of a book, or in the form of a back section of the source material work. The page numbers of such Progressive Reference would correspond (as well as practical) to the page numbers of the source material work. On each page of the Progressive Reference itself, a list of defined terms in the order they appear on the page in source material work, or, alternatively, in alphabetical order, would be presented with the definitions appropriate to that page or even to the place on the page.

Even in book form, entries could comprise photos, art works, graphics, charts, and other forms of expression suitable to print. If it took more than one page in the Progressive Reference to display all of the entries belonging to a page in the source material, the following page number would be found under the same page number as in the source material work followed by the letter, "a." If two pages were required, the second page would be the same page number as in the source material followed by the letter, "b." And, so on.

The preparer of the Progressive Reference determines which terms are to be defined and prepares the entries coded by the page number, scene number, or other indicia of place or progress where the term appears. Similarly, the preparer would have to prepare as many entries as practical to encompass all of the reader/user characteristics anticipated in the reader/user population.

Correspondingly, and in order for the user to look up the entry, the user must supply the point in the source material beyond which the user does not wish information. This is usually where the reader or viewer is at in the source material at the moment he or she is requesting the information. Further examples of places in the source material where a user would encounters a term he or she would want further information include a page number, a place in the development of a musical score, a scene in a movie, a level or point of play in a video game, an instruction in a computer program, or a paragraph in a text book. In the case of a video game, characters, clues, scenes, locations, weapons, and charms are normally revealed in sequence and only under certain conditions. In this case, the information in an entry would depend not only on the sequence of play, but also on what the player had accomplished and, possibly, other reader characteristics such as the player's age.

Just as the preparer has to anticipate, and provide for reader characteristics, the user has to supply pertinent information about him/herself in order for the system to point to the appropriate citation in the Progressive Reference. In the case of a text book, particularly, a student might want only the textbook information presented to a certain point in the text because more information would be confusing or because the student would want to be required to learn only what is needed for an upcoming test. Even so, in this example, a student might supply personal information that adjusts the limitation just mentioned to add information that he/she would be assumed to know based on the student's academic level, course of study, and so on.

An electronic progressive reference can have means for the user to recall previous terms that the user referenced along with their respective citations for review at a later date and for comparing the different citations as they changed over time. In addition, an electronic progressive reference can store such look-ups for a teacher or administrator as a tool for gauging the frequency with which different terms were referenced by different types of users.

EXAMPLE

For purposes of the remainder of this description, the term, Source Text is the Primary Work (such as a novel, videogame, movie, textbook, computer program, music, or other kind of database) on which the Progressive Reference is based. A Key Entry is a word or group of words representing a person, place, thing, idea or action from the Source Text; this is the term that the user looks up. An Entry is the complete citation, or answer to the user's query, which includes the Key Entry and its description. The inventor believes that these are the common terms used in the art of compiling reference books.

Although this invention will be found to be useful for analyzing all sorts of databases, the example used here is a mystery novel. As a user reads the novel, she frequently encounters a character or a thing which she is supposed to remember from earlier in the novel. It is an aspect of this technology that when she looks up the character or thing, she can learn what has already been revealed in the unfolding plot without learning so much about the subject that the plot will be given away or the suspense spoiled.

In writing or editing a Progressive Reference, the judgment of the writer and editor is even more crucial than for a standard glossary or concordance because the writer will attempt to include clues and significant facts that are both worthy of recall and important at that moment in the story—without inadvertently or gratuitously giving away the plot. In some Progressive References, supporting non-source material information of a historical, mythological and etymological nature may be included in the Entry. But, to stay true to the intention of the invention, the preparer will not include information that, preferably, should appear in the Entry for the same term when it appears later in the source material.

Examples of supporting information that may be contained in a Progressive Reference include standard dictionary definitions, translations such as British English to American English; pronunciation guides and audio samples; graphics such as photos, drawings, and art reproductions; music; references to other sources; and URLs. Again, all of this supporting material, in the judgment of the preparer, must not confuse the reader or anticipate later events inadvertently by including data prematurely.

A preparer can take advantage of standard word processing and video editing applications by preparing an index or a set of tags for words, ideas, actions, code sequences, photos, or scenes of interest.

These tags can be used on two ways. One way is to copy the last Entry along with new source material relevant to the term (or Key Entry) that appears since the last Entry. In this case, the preparer makes the new Entry by editing the last Entry and incorporating ideas or text from the new source material. A second way takes more time but can avoid the mistake of missing a prior occurrence of a term that is not reflected in the last Entry but has now, at this point in the source material, become more relevant. This second way presents to the preparer not only the last Entry and the new relevant material, but also all of the instances where the Entry or underlying subject matter has, so far, occurred in the source material. Either way, the preparer should also revise earlier Entries when it becomes apparent that overlooked source material is now important. (Specially designed GUIs can make these Tags available, by means of dedicated look-up tables, to users who wish to follow the sequence of specific actions, ideas, concepts, people or things in the Source Text.

The invention requires that Entries be prepared, in advance, (either manually or by automatic or semi-automatic software designed to compile encyclopedic entries as is known in the art) and stored in the system, preferably in a look-up table as follows:

| Look-up Table | | | |
|---|---|---|---|
| Column 1 | Column 2 | Column 3 | Column 4 |
| Key Entry | Pg # | Entry | Row 1 |
| Key Entry | Pg # | Entry | Row 2 |
| Key Entry | Pg # | Entry | Row 3 |
| Key Entry | Pg # | Entry | Row 4 |
| Key Entry | Pg # | Entry | Row 5 |

Column 2 may contain more place information such as volume #, revision #, paragraph #, line #, bar # (music), scene #, etc.

Note that, unlike conventional concordance entries, an Entry has to be prepared and stored in the look-up table for each page number, or place, where, in the judgment of the preparer, significant new information for that Key Entry appears in the Source Text.

A Progressive Reference can assume the form of any other reference work such as a book, as in the example provided below. Or, it can be a computer program, a web site, or a computer-aided device. Examples of such computer-aided devices include a computer game, a PDA, an E-Book, or a mobile phone. In the case of a computer program or computerized device, the user will have access to an interactive Graphical User Interface (GUI) that allows the user manually, or automatically, to enter the page number, scene, time, place, or other indicia of where in the sequence of the Source Text the user is. The GUI may be visual, tactile, or aural.

Some GUI's, where applicable, will have means for the user to enter more precise information than the page number. This can include the Volume #, the Version or revision number, the Paragraph number, and the line number. GUIs will have means to display the resulting Entry. Some GUI's will be able automatically to store and retrieve place information that changes only occasionally such as the Volume Number, and/or Version Number.

Some GUI's will receive such inputs automatically. For example, a computer, PDA or E-Reader will contain a digital version of the Source Text or source data. Thus, Key Entries can be requested by the user placing the curser on the word the user wants to look-up, (the Key Entry)—automatically referencing a term along with its place in the Source Text.

Certain slower systems will benefit by the GUI's constructing, and storing in the computer's RAM, a page-specific look-up table each time a page number is selected. Similarly, GUI design can allow the User to store other small reference item look-up tables in RAM for faster access.

Another method of accessing entries is to display for the reader a separate list of terms (Key Entries) for each page of text or source data. Thus, as a page of Source Text is displayed, a corresponding table of Key Entries specific to that page is displayed or conveniently accessible.

Entries can be assembled for each page by type or genre. For example, a film clip, a definition, an example, a picture, a translation, a synonym, music, a musical score, a voice recording, computer or other type of notation, etc.

The GUI can be told automatically what page the E-Viewer is displaying by a software routine in the E-Book or E-Reader software as the pages are "turned." Similarly, audio books can store and play audio versions of Entries.

Flow Charts

A flow chart for the System includes two sections, shown below. The first flow chart shows a system for convenient retrieval of the Entry by the reader. The second describes how an Entry can be prepared by an editor and placed in the Look-Up Table, manually or automatically.

Flow Chart #1

Retrieval of an Entry

1. Key Entry and Place information (see column 2 above) are entered into the reader's GUI, either manually by the reader or automatically.
2. The GUI instructs the software to go to the Look-Up Table.
3. For each Key Entry, The software looks in column 1 of Table 1 for the Key Entry and puts the corresponding rows into memory location 1.
4. Then, the software looks in column 2 of the Look-Up Table for a match on the entered Place information and puts the matching row number(s) into memory location 2.
5. The software then compares the contents of memory location 1 and 2 and selects the row number which appears in both memory locations.
6. The software then goes to the Look-Up table and copies the column 3 ENTRY for the selected row to the GUI.
7. The GUI can also be sent to other look-up tables to display, where available, additional stored information pertaining to the Reference Item, possibly by page number.
8. If no match is found, the following possibilities are explored:
    a. Common misspellings are searched using a "Misspellings look-up table." When a misspelling is found, the system starts again using the Key Entry found in the "Misspelling table."
    b. The first time a Key Entry is used in the Source Text and if no extraneous information is included by the preparer, the following is displayed at the Entry: "This is the first use of the term."
    c. If the term does not appear on the cited page, the following is displayed at the Entry: "This term is not used on this page; the last time the term was used was on Page X." (With a sub routine to add the correct page number for the last use)

For speed of retrieval, certain systems will construct a look-up table for each page that is constructed "on-the-fly" by the GUI each time a page is turned or manually entered. This will allow the GUI to search very small, page-specific, look-up tables that can be stored in small memories. Similarly, the User can use other small Reference Item look-up tables stored in RAM.

Flow Chart #2

Preparation of an Entry

In one embodiment of the presently described technology, using a novel as the example, the preparer, goes through two or three stages:

Stage 1 (or Stage 1a and 1b):

The look-up table contains three columns. Column 1 is the Key Entry. Column 2 is the page number or place in the Source Text where the Key Entry occurs. Column 3 is the Entry.

The preparer starts on page 1 and continues forward. In Column 2, the preparer enters the numeral representing the page number. In column 1, the preparer enters a Key Entry, on each successive row, for each term the preparer wants to explain on that page. Each Entry comprises a citation containing information that is revealed on that page alone. The preparer may add relevant information available from outside sources such as the definition, the pronunciation, the etymology, germane historical antecedents, and cultural allusions, but nothing from a future page in the text. In Stage 1, once a Key Entry has been selected, it always generates an Entry wherever it recurs in the text. (If the preparer feels that a subsequent Key Entry adds no new information of importance, the preparer can indicate something like, "no new information." Thus, in the final editing that takes place in Stage 3, the Entry for said subsequent Key Entry will be unchanged from the previous time that Key Entry appeared. On each page of the source text, the preparer will be looking for new Key Entries to add.

Still in stage 1, when a Key Entry reappears, the preparer creates its new Entry by copying the Key Entry's last Entry and adding new information. As was the case in preparing each previous Entry, the preparer may supply new extra information as appropriate. At the end of Stage 1, every Entry in the Progressive Reference will comprise information from the specific place it appears (along with extra information specifically appropriate at each point in the text) concatenated to each of the previous Entries for that Key Entry.

Another approach for an individual preparer, and one that may be preferred when there are multiple preparers, is to break up Stage 1 into two stages. In this case, Stage 1a is the preparation of every Entry individually. Then, in Stage 1b, the Entries are sequentially concatenated.

The use of multiple preparers is advantageous and possibly novel and non-obvious in the following method: Using the internet, multiple participants are invited to prepare individual Entries. If there were thousands of participants, it would be possible for the organizer to receive all of the Entries for an entire text in a few days. The organizer would then assign the editing task described in Stage 2 to individuals responsible for specific Key Entries. The Harry Potter example, shown below, shows three stages.

Stage 2:

Stage 2 is an editing function. The objective of Stage 2 is to edit each Entry to retain only that which remains important from the new Entry for a Key Entry combined with its previous Entry.

Flow Chart Steps for Preparation of Progressive Reference

Step 1: Create a look-up table with as many "place" columns as necessary plus five additional columns. There should be an unlimited number of rows. In this example, there are two "place columns, one for the Volume's name and number, and one for the page number." It may also be desirable to have a column for the line number or section of the page.

Step 2: Label the columns as follows:

| Column 1 | Row Number |
| Column 2 | Source Text Name and Volume Number |
| Column 3 | Page Number |
| Column 4 | Key Entry |
| Column 5 | Entry for This Page (For Stage 1a) |
| Column 6 | Complete Entry (For Stage 1b) |
| Column 7 | Edited Entry (For Stage 2) |

Step 3: Label the first row: Column Number
Step 4: Label the second row: Column Labels
Step 5: Number the following rows successively Example of a Progressive Reference Preparation Table

| | | Col No. | | | | |
|---|---|---|---|---|---|---|
| | 2 | | | 5 | 6 | 7 |
| | Source Text | 3 | 4 | Entry for | Complete | Edited |
| Row | Name and | Page | Key | this Page | Entry | Entry |
| No. | Volume Number | No | Entry | Stage 1a | Stage 1b | Stage 2 |
| 1 | Vol. 1 Harry | | | | | |
| 2 | Potter and the | 1 | | | | |
| 3 | Philosopher's | 1 | | | | |
| 4 | Stone | 1 | | | | |
| 5 | | 1 | | | | |
| 6 | | 2 | | | | |
| 7 | | 2 | | | | |
| 8 | | 2 | | | | |

Step 6: Write the Source Text Title, Volume and Version No. (If applicable) in Row 1, Column 2.

Step 7: Create the first Key Entry by writing the first page number of the Source Text in Row 2, Column 3.

Step 8: Write the first Key Entry you have chosen in Row 2, Column 4.

Step 9: In the same row, in Column 6 create the Entry for the Key Entry that you entered in Row 2, Col 4.

Step 10: For each Key Entry you choose to enter into the table from this first page of the Source Text, repeat steps 7 through 9.

At the end of Step 10, you should have created and entered all of the Key Entries and their respective Entries from the first page of the text.

Step 11: Write the second page number of the Source Text in Col. 3 of the next empty row.

Step 12: In the row you selected in Step 11, create the first Key Entry from Page 2 of the Source Text, and write it in Column 4.

Step 13: In the same row, create the Entry in Col. 5 for the Key Entry you entered in Step 12.

Step 14: For each Key Entry you entered from the second page of the Source Text, repeat steps 12 and 13.

At the end of Step 14, you should have entered all of the Key Entries with their respective Entries from the second page of the text.

The following Stage 1b and Stage 2 steps will allow you to create an edited final Entry in Column 7:

Step 15: Read each row in column 4 looking for a Key Entry to be repeated. Once a repeat occurs, it will represent an instance where a Key Entry in the Row that contains a 1 in col. 3 matches a Key Entry in the row that contains a 2 in col. 3.

Step 16: Manually or automatically, and into column 6 in the row of the second Key Entry of the match, copy, so as to concatenate, the contents of column 5 in the row of the first Key Entry of the match and the contents of column 5 in the row of the second Key Entry of the match.

Step 17 In Stage 2, rewrite the contents of column 6 into column 7 by removing redundancies and unimportant detail. Try to create a clear and concise final Entry.

In some instances, particularly in a manual system, the preparer may choose to create an edited Entry in column 7 by going directly to Stage 2 (step 17), at the end of each page. In this case, the preparer will concatenate the most recent column 7 Entry with the new column 5 Entry to make a new column 6 Entry.

Alternatively, the preparer may repeat steps 15 and 16 for each successive page leaving step 17 until all of the Entries for the whole Source Text have been created. In this case, column 6's Entries will swell as each accumulates its string of all of the previous Entries for each instance of the same Key Entry. Nonetheless, this long-winded method has the advantage of preserving every previous Entry in its entirety for a final edit. By performing step 17 only once, at the end, it may be less likely that the preparer will prematurely edit out an important detail from an earlier entry. Furthermore, as discussed above, it is the most efficient method of incorporating Entries prepared by many authors. This one edit method may necessitate a final review of the entire progressive reference before publication to make certain that Entries do not miss an important detail from earlier in the Source Text.

A reminder that, in Step 17, the preparer has the opportunity, once again to add non-Source Text material to each final edited Entry such as a dictionary definition, but it is the object of the invention not to reveal information from following pages. Preferably, the information provided by an Entry may provide hints, but does not unduly reveal information that will spoil the suspense or add an unnecessary burden for the reader.

This invention also includes means for automating the Progressive Reference preparation process using a computer program that uses queries to take the preparer through the steps described above. Starting on page one, the program would read the source text. The preparer's GUI would allow the preparer to identify those words in the text that the program should copy into column 4 as a new Key Entry. Each time a Key Entry reappeared in the text, the program would copy it into column 4. When so entering a Key Entry, the GUI would also indicate the place information in the appropriate columns. The program would also copy into column 6 all previous Entries.

In addition to presenting the Source Text as a convenient way for the GUI to identify existing Key Entries and for the preparer to identify new Key Entries in column 5, the GUI would prompt the preparer to create Key Entries other than words taken directly from the Source Text. Examples of such GUI prompts could include "Any major ideas or themes on this page? It could provide a check list of previous Key Entries in certain categories organized by the preparer. And, it could prompt for Entries of other types, such as film clips and GUIs, or for Entries of external information such as histories, allusions and translations.

Example of Preparation of a Progressive Reference

Here is an example of a Progressive Reference for the first seven pages of Harry Potter. Key Entries are in Italics:
Step 1: Information is entered from the page itself and, when and if appropriate, from outside sources:

Volume 1, *Harry Potter and the Sorcerer's Stone*

Progressive Reference

After Completing Step 1a

Page 1

Step 1a

Chapter 1

*The Boy Who Lived*

Mr. and Mrs. Dursley
   The Dursleys live at number four Privet Drive. Privet is a type of hedge that makes for landscaping that creates the appearance of tidiness and order. In French, it means private or hidden.
   The Dursley's are "Perfectly normal," and don't "hold with . . . anything strange or mysterious.
   The Dursleys have everything they want.
   But, the have a secret, and,
   Their greatest fear is that someone will discover their secret.
Mr. Dursley
   The Director of a firm called Grunnings which makes drills
   Big and beefy with a short neck and large mustache
Mrs. Dursley
   Thin and blonde with a long neck
   Spies on neighbors
Dudley Dursley
   Small son doted on by his parents Page 2

Step 1a

The Potters
   Mrs. Potter is Mrs. Dursley's sister.
   Mrs. Potter and Mrs. Dursley haven't met for several years.
   Mrs. Dursley pretends she doesn't have a sister.
   Mrs. Dursley thinks that Mr. Potter is a "good-for-nothing."
The Potters' Small Son
   The Dursley's have never seen him and they don't want their son mixing with "a child like that."
Dudley Dursley
   Having a tantrum; the Dursleys love him anyway.
Strange Things
Will soon be happening all over the country
Its Tuesday
A cloudy sky
Large Tawny Owl
   Tawny is a color; a light brown to brownish orange
   Flutters past the Dursley's window.

Mr. Dursley
   Dotes on his son even when he is having a tantrum
   Thinks he sees a cat reading a map, dismisses it as impossible
A Tabby Cat
   A Tabby cat is a cat with a gray or tawny coat mottled with black. It is sometimes called simply a Tabby.
   Is sitting on the corner consulting a map
A Map
   Is being read by a tabby cat on the corner in front of the Dursley's house Page 3

Step 1a

Mr. Dursley
   Disbelieves his first notion that he saw a cat on the corner consulting a map and, later, reading a street sign
   Hoping to get a large order of drills
   Is driving to town and arrives at his office after seeing people dressed in cloaks
   Always sits with his back to the window in his office on the $9^{th}$ floor
Cat
   Reads the sign that says Privet Drive
Map
   Disappears
People in Cloaks
   Encountered by Mr. Dursley, on his way to work, on the edge of town, while in the usual traffic jam
Cloaks
   A cloak is a loose outer garment, such as a cape.
   A cloak can conceal what is inside
   Worn by people milling about the edge of town on Tuesday morning
Traffic Jam
   Mr. Dursley usually finds himself in a traffic jam on the way to work
Emerald-green Cloak
   Worn by a man who is older than Mr. Dursley. He is seen by Mr. Dursley milling about on Tuesday morning whit other strangely dressed people.
   "Green gives stability, endurance and quietude. People with the luminous green of Saturn in their aura are the harmonizers and pacifiers of the world. They stand for social stability." (© S.F.Heart.com)
Owls
   Seen swooping about in broad daylight, past Mr. Dursley's window, above gaping onlookers.
   Owls usually fly silently and at night so are seldom seen by people outside of zoos.

Page 4

Step 1a

Mr. Dursley
   Likes to yell at people
   Eats buns (donuts)
   Hears on Tuesday morning, the strangely dressed people talking excitedly about the Potters
Harry Potter
   Is the son of the Potters Page 5

Step 1a

Tiny Old Man in Violet Cloak
  With a squeaky voice (What is the significance of a tiny man with a squeaky voice?)
  Is bumped into by Mr. Dursley on Tuesday morning outside Mr. Dursley's office
  Is rejoicing
  "Violet is the seventh and last color of the spectrum. It represents the seventh and highest quality a person attains-noble spiritual aspiration. Therefore it has always been connected to the priestly ceremonies. Purple and violet speak of honor, spirituality and self-esteem." (© S.F.Heart.com)
Mr. Dursley
  Outside Mr. Dursley's office on Tuesday morning, Mr. Dursley bumps into a tiny old man in a violet cloak who speaks to him rejoicing in what has happened.
  Doesn't approve of imagination
  Returning from work on Tuesday morning, sees the same tabby cat sitting on wall; loudly shoos cat.
You-Know-Who
  Reputed to be gone at last
Muggles
  People like Mr. Dursley
Tabby Cat
  Sitting on wall, at the end of the workday on Tuesday, when Mr. Dursley returns home
  Has markings around its eyes Page 6

Step 1a

Tabby Cat
  When shooed, doesn't move; gives stern look to Mr. Dursley
Owls
  Hundreds are sighted around the nation on Tuesday
Shooting Stars
  There is a "downpour" of them on Tuesday
Predicted Rain
  Doesn't happen on Tuesday Page 7

Step 1a

Mr. and Mrs. Dursley
  On Tuesday evening, discuss the Potters and the strange goings on in town.
Harry Potter
  Is Dudley's age
Dudley
  Is Harry's age
Tabby Cat
  Is still there, Tuesday night looking expectedly down Privet Drive "as though it were waiting for someone."
Step 1b: The preparer copies, for each Entry, all of the information from the previous Entry for the same Key Entry. If this were to be done automatically, the software would copy and paste the previous Entry in front of, or before, the Entry being prepared.

Here is the result of Step 1b for the first seven pages:

Volume 1, *Harry Potter and the Sorcerer's Stone*

Progressive Concordance

After completing Step 1b

Page 1

Step 1b

Chapter 1

*The Boy Who Lived*

Mr. and Mrs. Dursley
  The Dursleys Live at number four Privet Drive Privet is a type of hedge that makes for landscaping that creates the appearance of tidiness and order. In French, it means private or hidden.
  "Perfectly normal," and don't "hold with . . . anything strange or mysterious
  Have everything they want
  Have a secret
  Their greatest fear is that someone will discover their secret
Mr. Dursley
  The Director of a firm called Grunnings which makes drills
  Big and beefy with a short neck and large mustache
Mrs. Dursley
  Thin and blonde with a long neck
  Spies on neighbors
Dudley Dursley
  Small son doted on by his parents Page 2

Step 1b

The Potters
  Mrs. Potter is Mrs. Dursley's sister.
  Mrs. Potter and Mrs. Dursley haven't met for several years.
  Mrs. Dursley pretends she doesn't have a sister.
  Mrs. Dursley thinks that Mr. Potter is a "good-for-nothing."
The Potters' Small Son
  The Dursley's have never seen him and they don't want their son mixing with "a child like that."
Dudley Dursley
  Small son doted on by his parents
  Having a tantrum; the Dursleys love him anyway.
Strange Things
  Will soon be happening all over the country
  Its Tuesday
  A cloudy sky
Large Tawny Owl
  Tawny is a color; a light brown to brownish orange
  Flutters past the Dursley's window.
Mr. Dursley
  The Director of a firm called Grunnings which makes drills
  Big and beefy with a short neck and large mustache
  Dotes on his son even when he is having a tantrum Thinks he sees a cat reading a map, dismisses it as impossible
A Tabby Cat
  A Tabby cat is a cat with a gray or tawny coat mottled with black. It is sometimes called simply a Tabby.
Is sitting on the corner consulting a map
A Map
  Is being read by a tabby cat on the corner in front of the Dursley's house Page 3

Step 1b

Mr. Dursley
  The Director of a firm called Grunnings which makes drills
  Big and beefy with a short neck and large mustache
  Dotes on his son even when he is having a tantrum
  Disbelieves his notion that he saw a cat on the corner consulting a map and, later, reading a street sign
  Hoping to get a large order of drills
  Is driving to town and arrives at his office after seeing people dressed in cloaks
  Always sits with his back to the window in his office on the $9^{th}$ floor
A Tabby Cat
  A Tabby cat is a cat with a gray or tawny coat mottled with black. It is sometimes called simply a Tabby.
  Is sitting on the corner, in front of the Dursleys' house, consulting a map and reading the street sign that says Privet Drive
A Map
  Is being read by a tabby cat on the corner in front of the Dursley's house
  Disappears
People in Cloaks
  Encountered by Mr. Dursley, on his way to work, on the edge of town, while in the usual traffic jam
Cloaks
  Worn by people milling about the edge of town on Tuesday morning
  A cloak is a loose outer garment, such as a cape.
  A cloak can conceal what is inside
Traffic Jam
  Mr. Dursley usually finds himself in a traffic jam on the way to work
Emerald-Green Cloak
  Worn by a man who is older than Mr. Dursley. He is seen by Mr. Dursley milling about on Tuesday morning whit other strangely dressed people.
Owls
  Seen swooping about in broad daylight, past Mr. Dursley's window, above gaping onlookers. This is unusual. Owls usually fly silently and at night so are seldom seen by people outside of zoos.

Page 4

Step 1b

Mr. Dursley
  The Director of a firm called Grunnings which makes drills
  Big and beefy with a short neck and large mustache
  Dotes on his son even when he is having a tantrum
  Disbelieves his first notion that he saw a cat on the corner consulting a map and, later, reading a street sign
  Hoping to get a large order of drills
  Is driving to town and arrives at his office after seeing people dressed in cloaks
  Always sits with his back to the window in his office on the $9^{th}$ floor
  Likes to yell at people
  Eats buns (donuts)
  On Tuesday morning, hears the strangely dressed people talking excitedly about the Potters
Harry Potter
  Is the son of the Potters
  The Dursley's have never seen him and they don't want their son, Dudley, mixing with "a child like that."

Page 5

Step 1b

Tiny Old Man in Violet Cloak
  With a squeaky voice (What is the significance of a tiny man with a squeaky voice?)
  Is bumped into by Mr. Dursley on Tuesday morning outside Mr. Dursley's office
  Is rejoicing
Mr. Dursley
  The Director of a firm called Grunnings which makes drills
  Big and beefy with a short neck and large mustache
  Dotes on his son even when he is having a tantrum
  Thinks he sees a cat reading a map, dismisses it as impossible
  Disbelieves his first notion that he saw a cat on the corner consulting a map and, later, reading a street sign
  Hoping to get a large order of drills
  Is driving to town and arrives at office after seeing people dressed in cloaks
  Always sits with his back to the window in his office on the $9^{th}$ floor
  Likes to yell at people
  Eats buns (donuts)
  Hears on Tuesday morning, the strangely dressed people talking excitedly about the Potters
  Bumps into tiny old man in a violet cloak on Tuesday morning outside Mr. Dursley's office
  Doesn't approve of imagination
  Returning from work on Tuesday morning, sees the same tabby cat sitting on wall; loudly shoos cat.
You-Know-Who
  Reputed to be gone at last
Muggles
  People like Mr. Dursley
A Tabby Cat
  A Tabby cat is a cat with a gray or tawny coat mottled with black. It is sometimes called simply a Tabby.
  Is sitting on the corner reading a map
  Reads the sign that says Privet Drive
  Sitting on wall, at the end of the workday, on Tuesday, when Mr. Dursley returns
  Has markings around its eyes

Page 6

Step 1b

A Tabby Cat
   A Tabby cat is a cat with a gray or tawny coat mottled with black. It is sometimes called simply a Tabby.
   Is sitting on the corner consulting a map and reading the street sign that says Privet Drive
   Sitting on wall, at the end of the workday, on Tuesday, when Mr. Dursley returns
   Has markings around its eyes
   When shooed, doesn't move; gives stern look to Mr. Dursley
Owls
   Seen swooping about in broad daylight, past Mr. Dursley's window, above gaping onlookers. This is especially unusual because owls fly silently and at night so are seldom seen by people by people outside of zoos.
   Hundreds are sighted around the nation on Tuesday
Shooting Stars
   There is a "downpour" of them on Tuesday
Predicted Rain
   Doesn't happen on Tuesday

Page 7

Step 1b

Mr. and Mrs. Dursley
   Live at number four Privet Drive
   "Perfectly normal," and don't "hold with . . . anything strange or mysterious
   Have everything they want
   Have a secret
   Their greatest fear is that someone will discover their secret
   On Tuesday evening, discuss the Potters and the strange goings on in town.
Harry Potter
   The Dursley's have never seen him and they don't want their son mixing with "a child like that."
   Is Dudley's age
Dudley
   Small son doted on by his parents
   Having a tantrum; the Dursleys love him anyway.
   Is Harry's age
A Tabby Cat
   A Tabby cat is a cat with a gray or tawny coat mottled with black. It is sometimes called simply a Tabby.
   Is sitting on the corner consulting a map and reading the street sign that says Privet Drive
   Sitting on wall, at the end of the workday, on Tuesday, when Mr. Dursley returns
   Has markings around its eyes
   When shooed, doesn't move; gives stern look to Mr. Dursley
   Is still there, Tuesday night looking expectedly down Privet Drive "as though it were waiting for someone."
Step 2: The preparer edits each Entry by removing what is redundant or now irrelevant. The preparer edits the Entry for brevity, comprehension and emphasis.
   Here is the final version the Progressive Reference through Page 7

Volume 1, *Harry Potter and the Sorcerer's Stone*

Progressive Reference

After Completing Steps 1a and 1b

Page 1

Step 2

Chapter 1

*The Boy Who Lived*

Mr. and Mrs. Dursley
   The Dursleys Live at number four Privet Drive. Privet is a type of hedge that makes for landscaping that creates the appearance of tidiness and order. In French, it means private or hidden.
   The Dursleys are "Perfectly normal," and don't "hold with . . . anything strange or mysterious.
   They have everything they want.
   They have a secret, and
   Their greatest fear is that someone will discover their secret.
Mr. Dursley
   Is the Director of a firm called Grunnings which makes drills.
   He is big and beefy with a short neck and large mustache
Mrs. Dursley
   Is thin and blonde with a long neck.
   She enjoys spying on her neighbors.
Dudley Dursley
   Dudley is the Dursley's small son. He is doted on by his parents.

Page 2

Step 2

The Potters
   Mrs. Potter is Mrs. Dursley's sister. The two have not met for several years.
   Mrs. Dursley pretends she doesn't have a sister and she thinks that her sister's husband Mr. Potter is a "good-for-nothing."
The Potters' Small Son
   The Potters have a small son whom the Dursley's have never seen. They don't want their son mixing with "a child like that."
Dudley Dursley
   The Dursleys have a small son whom they dote on even when he is having a tantrum
Strange Things
   Will soon be happening all over the country
   It's a cloudy Tuesday.
Large Tawny Owl
   Tawny is a color; a light brown to brownish orange.
   The large tawny owl flutters past the Dursley's window.
Mr. Dursley
   Is the Director of a firm called Grunnings which makes drills. He is big and beefy with a short neck and large mustache.
   Mr. Dursley dotes on his small son even when he is having a tantrum.
   Mr. Dursley thinks he sees a cat reading a map, dismisses it as impossible A Tabby Cat
- A Tabby cat is a cat with a gray or tawny coat mottled with black. It is sometimes called, simply, a Tabby.
- Mr. Dursley sees one sitting on the corner consulting a map A Map
- Is being read by a tabby cat on the corner in front of the Dursleys' house.

Page 3

Step 2

Mr. Dursley
- Mr. Dursley is the Director of a firm called Grunnings which makes drills. He is big and beefy with a short neck and large mustache.
- Mr. Dursley dotes on his small son even when he is having a tantrum.
- Mr. Dursley disbelieves his notion that he saw a cat on the corner consulting a map and, later, reading a street sign.
- Mr. Dursley is hoping to get a large order of drills.
- On his way to the office, while waiting in the usual traffic jam, he sees people dressed in cloaks.
- Mr. Dursley always sits with his back to the window in his office on the $9^{th}$ floor.

A Tabby Cat
- A Tabby cat is a cat with a gray or tawny coat mottled with black. It is sometimes called, simply, a Tabby.
- A Tabby is sitting on the corner in front of the Dursleys' house consulting a map and reading the street sign that says Privet Drive A Map
- Mr. Dursley sees a map being read by a tabby cat on the corner in front of his house.
- When Mr. Dursley looks again, the map has disappeared.

People in Cloaks
- Mr. Dursley sees people in cloaks on the edge of town, on his way to his office.

Cloaks
- Cloaks are worn by the people whom Mr. Dursley sees milling about the edge of town on Tuesday morning.
- A cloak is a loose outer garment, such as a cape.
- A cloak can conceal what is inside Traffic Jam
- Mr. Dursley usually finds himself in a traffic jam on the way to work.

Emerald-Green Cloak
- Mr. Dursley, on Tuesday morning sees a man, older than himself wearing an emerald-green cloak. The man is milling about with other strangely dressed people.
- "Green gives stability, endurance and quietude. People with the luminous green of Saturn in their aura are the harmonizers and pacifiers of the world. They stand for social stability." (© S.F.Heart.com) Emerald-Green may connote Irish.

Owls
- Seen swooping about in broad daylight, past Mr. Dursley's window, above gaping onlookers. This is unusual. Owls usually fly silently and at night so are seldom seen by people outside of zoos.

Page 4

Step 2

Mr. Dursley
- The Director of a firm called Grunnings which makes drills. He is big and beefy with a short neck and large mustache.
- Mr. Dursley dotes on his son even when he is having a tantrum.
- Mr. Dursley disbelieves his first notion that he saw a cat on the corner consulting a map and, later, reading a street sign.
- Mr. Dursley is hoping to get a large order of drills.
- On his way to the office, while waiting in the usual traffic jam, Mr. Dursley sees people dressed in cloaks.
- Mr. Dursley always sits with his back to the window in his office on the $9^{th}$ floor
- Mr. Dursley likes to yell at people
- Mr. Dursley eats buns (donuts)
- On Tuesday morning, Mr. Dursley hears the strangely dressed people talking excitedly about the Potters Harry Potter
- Harry is the son of the Potters. The Dursley's have never seen him. They do not want their son, Dudley, mixing with "a child like that."

Page 5

Step 2

Tiny Old Man in Violet Cloak
- Outside Mr. Dursley's office, on Tuesday morning, Mr. Dursley bumps into (literally!) a tiny old man, in a violet cloak, with a squeaky voice.
- The tiny old man in a violet cloak speaks to Mr. Dursley happily excusing him and rejoicing about what has happened.
- What is the significance of a tiny man with a squeaky voice? What is the significance of the color violet? (There is a plant called magic violet.)

Mr. Dursley
- The Director of a firm called Grunnings which makes drills. He is big and beefy with a short neck and large mustache.
- Mr. Dursley dotes on his son even when he is having a tantrum
- Mr. Dursley disbelieves his first notion that he saw a cat on the corner consulting a map and, later, reading a street sign.
- Mr. Dursley is hoping to get a large order of drills
- On his way to the office, while waiting in the usual traffic jam, Mr. Dursley sees people dressed in cloaks.
- Mr. Dursley always sits with his back to the window in his office on the $9^{th}$ floor
- Mr. Dursley likes to yell at people
- Mr. Dursley eats buns (donuts)
- On Tuesday morning, Mr. Dursley hears the strangely dressed people talking excitedly about the Potters.
- Outside Mr. Dursley's office, on Tuesday morning, Mr. Dursley bumps into (literally!) a tiny old man, in a violet cloak, with a squeaky voice.
- Mr. Dursley doesn't approve of imagination
- Returning from work on Tuesday morning, Mr. Dursley sees the same tabby cat sitting on wall; loudly shoos cat.

You-Know-Who
  Reputed to be gone at last
Muggles
  People like Mr. Dursley
A Tabby Cat
  A tabby cat is a cat with a gray or tawny coat mottled with black. It is sometimes called, simply, a Tabby.
  A tabby is sitting on the corner in front of the Dursleys' house consulting a map and reading the street sign that says Privet Drive
  The tabby is still sitting on a wall in front of the Dursley house, at the end of the workday, on Tuesday, when Mr. Dursley returns
  The tabby has markings around its eyes Page 6

Step 2

A Tabby Cat
  A tabby cat is a cat with a gray or tawny coat mottled with black. It is sometimes called simply a tabby.
  A tabby, with markings around its eyes, is sitting on the corner in front of the Dursleys' house when Mr. Dursley leaves the house on Tuesday morning. The tabby is consulting a map and reading the street sign that says Privet Drive. The tabby is still sitting on a wall in front of the Dursley house, at the end of the workday, on Tuesday, when Mr. Dursley returns. When shooed, the tabby doesn't move; instead it gives a stem look to Mr. Dursley.
Owls
  Seen swooping about in broad daylight, past Mr. Dursley's window, above gaping onlookers. This is unusual. Owls usually fly silently and at night so are seldom seen by people by people outside of zoos.
  Hundreds are sighted around the nation on Tuesday
Shooting Stars
  There is a "downpour" of them on Tuesday
Predicted Rain
  Doesn't happen on Tuesday Page 7

Step 2

Mr. and Mrs. Dursley
  The Dursleys Live at number four Privet Drive. Privet is a type of hedge that makes for landscaping that creates the appearance of tidiness and order. In French, it means private or hidden.
  The Dursleys are "Perfectly normal." They don't "hold with . . . anything strange or mysterious.
  They have everything they want.
  They have a secret, and
  Their greatest fear is that someone will discover their secret.
  On Tuesday evening, the Dursleys discuss the Potters and the strange goings on in town.
Harry Potter
  Harry is the son of the Potters. The Dursleys have never seen him. He is the Dursley's son, Dudley's age. The Dursleys do not want Dudley, mixing with "a child like that."

Dudley
  Dudley the son of the Dursleys is Harry's age. He is doted on by his parents.
  Even when he has a tantrum; the Dursleys love him anyway.
A Tabby Cat
  A tabby cat is a cat with a gray or tawny coat mottled with black. It is sometimes called, simply, a tabby.
  A tabby, with markings around its eyes, is sitting on the corner in front of the Dursleys' house when Mr. Dursley leaves the house on Tuesday morning. The tabby is consulting a map and reading the street sign that says Privet Drive. The tabby is still sitting on a wall in front of the Dursley house, at the end of the workday, on Tuesday, when Mr. Dursley returns. When shooed, the tabby doesn't move; instead it gives a stern look to Mr. Dursley. After Mr. Dursley goes into his house, the tabby looks expectedly down Privet Drive "as though it were waiting for someone."

Another particularly desirable implementation of the described technology is to provide an interactive site with the progressive definitions thereon. In that embodiment, distal electronic users may add to or enhance or comment upon the available progressive definitions through the internet. A modified version of this format would be for a regular update of the progressive definitions on-line by central system approval. As definitions collect on the open website, a central administrator will review the suggested changes and decide which if any proposed changes will be accepted. This would protect a base of the progressive definition technology against graffiti, vandalism or other intentional or unintentional damage. The review of the suggestions could be made at any time interval, such as daily, weekly, monthly, or the like.

The original patent application, U.S. Ser. No. 10/951,313, filed 27 Sep. 2005, from which this application claims priority, addresses several ways to reduce the cost and time for preparation of a Progressive Reference. The new information provides a Progressive Reference that, while not as exact as a Progressive Reference prepared in the ways described in the patent application—and therefore, only valuable when the time and cost require a simpler preparation method—can be prepared semi-automatically and, even, totally automatically.

If the user is ready a Primary work using a computer, a website, or other type of electronic reader, the reader can assemble a Progressive Reference on the fly, To prepare a Progressive Reference on the fly, the user, with the aid of a computer application, can call up information already in the Primary text to serve as the Source of Information the user needs. Here is how one embodiment of a Progressive Reference assembled or prepared by the user appears to the user:

The user touches on, or looks up, the key-word (e.g., selected by the user) with respect to a specific text. First, the sentence with the last occurrence of the key word in the specific text is instantly displayed. This initial step, of course, can operate similarly to the Edit/FIND function in word processors. The "FIND" function lets a reader find the previous, and next, occurrence of a word in an identified document, but does no more than highlight that term, or (using the Find/Replace function) replace that term with another specific term. It displays the full page with each occurrence of the word highlighted. But, it is a four-step process that requires the user to (1) Be in the document, (2) Call up the find function. (Control—F), (3) Type the key-word in the dialogue box, and (4) hit return. The "FIND"

dialogue box stays on the screen, and allows the reader to go the next occurrence, or previous occurrence of the word.) Find ordinarily scans the documents and immediately highlights and travels to the first appearance of the word or the next appearance. It also does not have a function of immediately returning to the last appearance.

In the simplest version of Progressive Reference LITE, only the last sentence in which the word occurred is reproduced. In a preferred version, the sentence along with some previous sentences and some following sentences are reproduced, identified (e.g., page and line number), or accessible in both forward (next, next [number, e.g., 2, 3, 5, etc.], previous or previous [number]. The choice of how many, if any, surrounding sentences are presented may also be accomplished by a user selectable setting, which is simple to program, or it is determined automatically and/or by default, if in exactly, by a program that selects the contiguous sentences that contain nouns and pronouns that suggest the contiguous sentences may deal with the same subject. Additionally, once that previous appearance has been revealed, there could/should be an automatic expansion function, such as the direction arrows allowing for expansion of the view of the text in different directions in the text, forward, backwards or both. Any position within the text may be selected as a reference point or starting point for a term. For example, if it is recalled that a character is introduced at a certain point in the story, or if there is a particular fact about a character that is desired at a generally known portion of the story, that point may be accessed and the search begun centrally from that point in the text.

The Progressive Reference LITE system next allows the reader to iterate backward as an automated function, if the reader wants more information, by "touching" (e.g., highlighting and engaging the function, right-button clicking, etc.) any word in the reference/citation. The reader can keep touching a word in each subsequent reference, back to the beginning of the book. Keep in mind, when iterating backward, the system remembers where the user started so that each time a key word is queried, even within a Progressive Reference citation, the new reference or citation is allowed to come only from text that has occurred prior to the location of the original key-word before the reader started to iterate the look-up. A "return" icon may be provided during the function to return the cursor and text function back to the original cite where the program was initiated.

A further feature in the LITE format allows a reader to expand the text of the reference/citation by touching a command that may be provided as an icon or use existing keyboard buttons (such as the arrows) when the function is engaged.

A further use of artificial intelligence will allow the reader, or a preparer, automatically to assemble a reference combining several previous occurrences of the word with redundancies eliminated.

The print version of a Progressive Reference LITE contains the last one, two or more occurrences of a key-word surrounded by selected, relevant text. A web site can easily have all of the functionality described above.

The present technology covers a search engine, different search parameters, and/or different search results and quality depending on the stated characteristics of the user. The term "Search Engine" may also include the traditional term "Web page." The process and technology described may also apply to more immediately observable content on the source or segment, and may be displayed in header format, such as footnotes or endnotes. These would be glossary-type definitions that follow our Progressive Reference rules. That is, they are unique to where the key-word occurs in the text, and not revelatory of information that occurs later in the text. (Avoiding Premature Revelation.)

What is claimed:

1. A reading device for displaying an electronic text and for accessing information relevant to the electronic text, comprising:
   a display screen;
   a processor coupled to a memory, the memory storing the electronic text and a software program;
   wherein the processor is programmed to access information relevant to the electronic text by:
   displaying at least a portion of the electronic text on the display screen;
   responsive to a selection from the display screen of a word or phrase from the electronic text on the display screen in situ, identifying only a selected word or phrase in the electronic text immediately previous to the selected word or phrase on the display screen and determining a location of the selected word or phrase in the electronic text immediately previous to the selected word or phrase on the display screen; and
   automatically displaying a sentence in which the selected word or phrase in the electronic text immediately previous to the selected word or phrase on the display screen appears.

2. The reading device of claim 1 wherein the sentence displaying step further comprises displaying a plurality of sentences contiguous to the sentence in which the selected word or phrase in the electronic text occurring immediately previous to the selected word or phrase on the display screen appears.

3. The reading device of claim 2 wherein in the sentence displaying step, the plurality of sentences contiguous to the sentence in which the selected word or phrase in the electronic text occurring immediately previous to the selected word or phrase on the display screen appears comprises one sentence before and after the sentence in which the selected word or phrase in the electronic text occurring immediately previous to the selected word or phrase on the display screen appears.

4. The reading device of claim 2 wherein the sentence displaying step further comprises displaying a predetermined number of sentences contiguous to the sentence in which the selected word or phrase in the electronic text occurring immediately previous to the selected word or phrase on the display screen appears.

5. The reading device of claim 4 wherein the sentence displaying step further comprises setting the predetermined number of sentences responsive to a selection.

6. The reading device of claim 1 further comprising:
   responsive to a selection of the selected word or phrase in the sentence immediately previous to the word or phrase selected earlier in the electronic text on the display screen, identifying only the selected word or phrase in the electronic text immediately previous to the selected word or phrase in the sentence immediately previous to the selected word or phrase, and determining a location of the selected word or phrase in the electronic text immediately previous to the selected word or phrase in the sentence immediately previous to the selected word or phrase; and
   automatically displaying the sentence in which the selected word or phrase in the electronic text immediately previous to the selected word or phrase in the sentence immediately previous to the selected word or phrase appears;

whereby a selected word or phrase in a sentence immediately previous to the word or phrase selected earlier in the electronic text on the display screen can be iteratively located in the electronic text and displayed.

7. The reading device of claim 1 wherein the display screen comprises a touchscreen and the selection of the word or phrase in the electronic text on the display screen comprises contacting the touchscreen.

8. The reading device of claim 1 wherein the selection of the word or phrase in the electronic text on the display screen comprises highlighting the word with a cursor on the display screen.

9. A method of operating a reading device having a display screen, a processor and a memory, for accessing information relevant to an electronic text, comprising:
  storing the electronic text in the memory;
  displaying at least a portion of the electronic text on the display screen;
  responsive to a selection from the display screen of a word or phrase from the electronic text on the display screen in situ, identifying with the processor only a selected word or phrase in the electronic text immediately previous to the selected word or phrase on the display screen and determining with the processor a location of the selected word or phrase in the electronic text immediately previous to the selected word or phrase on the display screen; and
  automatically displaying a sentence in which the selected word or phrase in the electronic text immediately previous to the selected word or phrase on the display screen appears.

10. The method of claim 9 wherein the sentence displaying step further comprises displaying a plurality of sentences contiguous to the sentence in which the selected word or phrase in the electronic text occurring immediately previous to the selected word or phrase on the display screen appears.

11. The method of claim 10 wherein in the sentence displaying step, the plurality of sentences contiguous to the sentence in which the selected word or phrase in the electronic text occurring immediately previous to the selected word or phrase on the display screen appears comprises one sentence before and after the sentence in which the selected word or phrase in the electronic text occurring immediately previous to the selected word or phrase on the display screen appears.

12. The method of claim 10 wherein the sentence displaying step further comprises displaying a predetermined number of sentences contiguous to the sentence in which the selected word or phrase in the electronic text occurring immediately previous to the selected word or phrase on the display screen appears.

13. The method of claim 12 wherein the sentence displaying step further comprises setting the predetermined number of sentences responsive to a selection.

14. The method of claim 9 further comprising:
  responsive to a selection of the selected word or phrase in the sentence immediately previous to the word or phrase selected earlier in the electronic text on the display screen, identifying only the selected word or phrase in the electronic text immediately previous to the selected word or phrase in the sentence immediately previous to the selected word or phrase, and determining a location of the selected word or phrase in the electronic text immediately previous to the selected word or phrase in the sentence immediately previous to the selected word or phrase; and automatically displaying the sentence in which the selected word or phrase in the electronic text immediately previous to the selected word or phrase in the sentence immediately previous to the selected word or phrase appears;
  whereby a selected word or phrase in a sentence immediately previous to the word or phrase selected earlier in the electronic text on the display screen can be iteratively located in the electronic text and displayed.

15. The method of claim 9 wherein the display screen comprises a touchscreen and the selection of the word or phrase in the electronic text on the display screen comprises contacting the touchscreen.

16. The method of claim 9 wherein the selection of the word or phrase in the electronic text on the display screen comprises highlighting the word with a cursor on the display screen.

17. In an electronic reader with a display screen and a processor for reading an electronic text, a non-transitory computer-readable storage medium with an executable program stored thereon, wherein the program instructs the processor to perform the following steps:
  displaying at least a portion of the electronic text on the display screen;
  responsive to a selection from the display screen of a word or phrase from the electronic text on the display screen in situ, identifying with the processor only the selected word or phrase in the electronic text immediately previous to the selected word or phrase on the display screen and determining with the processor a location of the selected word or phrase in the electronic text immediately previous to the selected word or phrase on the display screen; and
  automatically displaying a sentence in which the selected word or phrase in the electronic text immediately previous to the selected word or phrase on the display screen appears;
  whereby information relevant to the electronic text is accessed.

18. The non-transitory computer-readable storage medium of claim 17 wherein the sentence displaying step further comprises displaying a plurality of sentences contiguous to the sentence in which the selected word or phrase in the electronic text occurring immediately previous to the selected word or phrase on the display screen appears.

19. The non-transitory computer-readable storage medium of claim 18 wherein in the sentence displaying step, the plurality of sentences contiguous to the sentence in which the selected word or phrase in the electronic text occurring immediately previous to the selected word or phrase on the display screen appears comprises one sentence before and after the sentence in which the selected word or phrase in the electronic text occurring immediately previous to the selected word or phrase on the display screen appears.

20. The non-transitory computer-readable storage medium of claim 18 wherein the sentence displaying step further comprises displaying a predetermined number of sentences contiguous to the sentence in which the selected word or phrase in the electronic text occurring immediately previous to the selected word or phrase on the display screen appears.

21. The non-transitory computer-readable storage medium of claim 20 wherein the sentence displaying step further comprises setting the predetermined number of sentences responsive to a selection.

22. The non-transitory computer-readable storage medium of claim 17 further comprising:

responsive to a selection of the selected word or phrase in the sentence immediately previous to the word or phrase selected earlier in the electronic text on the display screen, identifying only the selected word or phrase in the electronic text immediately previous to the selected word or phrase in the sentence immediately previous to the selected word or phrase, and determining a location of the selected word or phrase in the electronic text immediately previous to the selected word or phrase in the sentence immediately previous to the selected word or phrase; and automatically displaying the sentence in which the selected word or phrase in the electronic text immediately previous to the selected word or phrase in the sentence immediately previous to the selected word or phrase appears;

whereby the selected word or phrase in a sentence immediately previous to the word or phrase selected earlier in the electronic text on the display screen can be iteratively located in the electronic text and displayed.

23. The non-transitory computer-readable storage medium of claim 17 wherein the display screen comprises a touchscreen and the selection of the word or phrase in the electronic text on the display screen comprises contacting the touchscreen.

24. The non-transitory computer-readable storage medium of claim 17 wherein the selection of the word or phrase in the electronic text on the display screen comprises highlighting the word with a cursor on the display screen.

* * * * *